Jan. 30, 1962 J. S. EGGENBERGER ETAL 3,019,125

THIN MAGNETIC FILM

Filed Nov. 18, 1958

INVENTORS
JOHN S. EGGENBERGER
JOHN C. LLOYD
ROBERT S. SMITH
BY
AGENT

United States Patent Office 3,019,125

Patented Jan. 30, 1962

3,019,125

THIN MAGNETIC FILM

John S. Eggenberger, Wappingers Falls, and John C. Lloyd and Robert S. Smith, Poughkeepsie, N.Y., assignors to International Business Machines Corporation, New York, N.Y., a corporation of New York Filed Nov. 18, 1958, Ser. No. 774,656
4 Claims. (Cl. 117—8)

This invention relates to thin magnetic films and in particular to a method by which such films having useful magnetic properties may be prepared.

It is well known in the art that certain alloys, prepared in the form of thin magnetic films, of the order of 2000 A. thick, exhibit the rectangular or square hysteresis loop and rapid domain reversal characteristic of magnetic memory storage devices used in computer circuitry. In general, thin magnetic films may be produced by high vacuum evaporation or electrodeposition of suitable ferromagnetic material, such as 80–20 Ni-Fe alloy, onto suitable support substrates. These magnetic films are further characterized in that the magnetization prefers to point either parallel or antiparallel to some direction in the plane of the film. This direction is called the easy axis. General practice is to attempt to completely align the magnetization in the plane of the film by imposing an external magnetic field during preparation of the film. Very often, however, the film thus prepared is randomly oriented, resulting in poor performance. It has been the object of considerable research to provide other methods by which the easy direction of magnetization may be controlled in a convenient and reproducible manner.

Through the application of a magnetic field, the magnetization may be induced to switch from one direction along the easy axis to the opposite direction by either one of two modes. The first mode is one which all elements of the domain reverse simultaneously and is called domain rotation. The field required to induce this mode of reversal will hereinafter be called the rotational coercive force, $H_k$. The second mode of magnetization reversal is one in which an area of reversed magnetization grows at the expense of the unreversed area. The field required to induce this mode of magnetization reversal will hereinafter be called the wall motion coercive force $H_w$. The field, $H_w$, required to induce domain wall motion switching is generally much lower than is the field $H_k$ required to induce rotational switching. Thus switching occurs predominately by a wall motion process, which is observed to be much slower than rotational switching. $H_w$ has also been observed to increase with decreasing film thickness while $H_k$ remains relatively constant. A film may be made to switch by rotation therefore by making it sufficiently thin; however, this method is considered to be quite unsatisfactory in practice since the output signal from a given memory element decreases substantially with a reduction in film thickness.

Accordingly the object of this invention is to provide an improved thin film memory element.

Another object of this invention is to provide methods by which the orientation and the direction of easy magnetization of thin magnetic films may be conveniently and reproducibly controlled.

Still another object is to increase the wall motion coercive force so that the film will switch by domain rotation rather than domain wall motion.

Other objects of the invention will be pointed out in the following description and claims and illustrated in the accompanying drawings, which disclose, by way of example, the principle of the invention and the best mode, which has been contemplated, of applying that principle.

This invention is based upon the discovery that the magnetic properties of thin magnetic films, and in particular the direction of easy magnetization and magnitude of the wall motion coercive force, may be influenced by the macroscopic structure of the substrate member on to which the thin metallic layer is deposited. Specifically it is observed that if the thin film is deposited over a substrate which has been provided with a plurality of closely spaced parallel grooves or serrations, the easy axis will align itself parallel to the direction of the grooves. This method of fabrication therefore produces thin magnetic films whose direction of easy axis may be controlled to a far greater degree than would be possible with an orienting externally applied magnetic field. In addition, the wall motion coercive force varies with the dimensions of the grooves or scratches, so that this procedure enables one to lay down materials with a wide range of magnetic properties within a small area.

Figure 1:
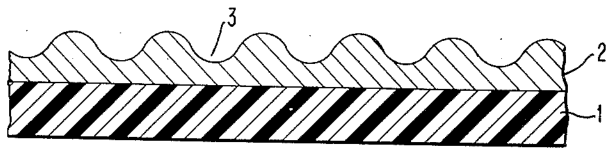
FIG. 1 is a front elevational view in section of a roughened substrate member.

FIG. 1 shows a schematic representation of a roughened substrate layer according to the present invention. Although many substrate members may be used, including those made of glass and plastics, a phenolic board 1 covered with a conducting layer of copper 2 may be advantageously employed. Such a substrate may be conveniently provided with a series of grooves 3 of desired depth, as for example, by scribing on it with a polishing abrasive applied from a suitable polishing wheel, with a ruling engine or using an etching machine. Various abrasives may be used for this purpose having different grit sizes and causing different size grooves. The abrasive paper designated as Abrasive Paper "320" and supplied by the Behr-Manning Company produces very satisfactory results.

After the substrate member is prepared as described above, a thin magnetic film such as one having a 80–20 percent by weight ratio nickel-iron is deposited thereon. Several methods are known in the art by which the metallic layer may be formed, including vacuum evaporation and electrodeposition.

Figure 2:
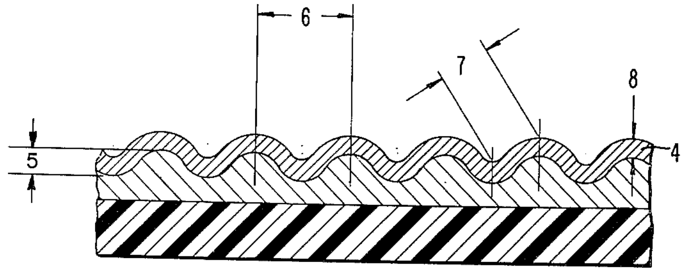
FIG. 2 is a schematic representation in section of a thin magnetic film element according to the present invention and comprising a substrate member and a thin metallic layer deposited thereon.

FIG. 2 shows a typical film prepared by electrodeposition. On a microscopic level it is preferable that the metallic deposit 4 follow the wavy appearance of the substrate in order that the film have a uniform thickness. It may be noted that, for a given amount of metal deposited, the film thickness is less than for a flat film, resulting in a thin film element having both a relatively high wall motion coecive force and high signal output. Films having a substrate scratched with the aforementioned Abrasive Paper "320," for example show a peak to valley height 5 of about 8 microns, a peak to peak distance 6 of about 48 microns and a lateral peak to valley distance 7 of about 25 microns with a film thickness 8 of about 2,000 to 10,000 A. Films with this geometry show an effective thickness decrease by a factor of about 1.5 as compared to conventional smooth substrates.

Figure 3:
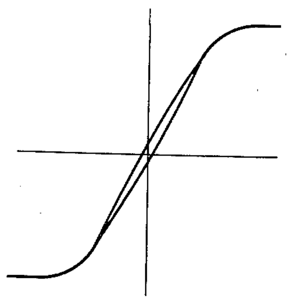
FIG. 3 is a reproduction of a typical 60-cycle hysteresis loop taken of a thin magnetic film according to the present invention provided with a roughened substrate member and taken with the planes of the drive and sense coils parallel to the easy axis of magnetization and perpendicular to the plane of the film, or in the so called "hard" direction of magnetization.
Figure 4:
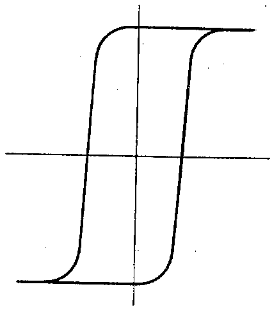
FIG. 4 shows a similar picture taken along the easy direction of magnetization.

FIGS. 3 and 4 illustrate the 60 cycle hysteresis characteristics of films prepared using roughened substrates and no external magnetic field. The extent of closure of the hard direction loop, shown in FIG. 3, indicates that the easy axis is well aligned with the grooves over the entire area of the film. The loop shown in FIG. 4 shows a hysteresis loop measured in the easy direction on films prepared according to the fabricating procedure of the present invention. The good squareness and sharp knees of the loop indicates the usefulness of these films for application as memory elements in coincident current computer circuitry.

According to the practice of this invention the films may be prepared by an evaporation or an electroplating process. If the latter method is used, however, it is important to control the current density at which the plating takes place in order that the magnetic field induced by the plating current does not influence the orientation of the film imposed by the substrate structure. Preferably plating should be carried out at a current density below 60 ma./in.$^2$ Another advantage is realized by fabricating the thin film elements according to the procedure described herein. It is known that faster switching of bistable thin film elements is achieved by using higher fields and/or using rotational switching rather than wall motion switching. In previous thin magnetic films, however, the threshold field required to switch by domain wall motion was much lower than that field required to switch by rotation. In coincident-current systems, therefore, where the magnitude of the full select driving field is limited by the requirement that its half-select field not exceed the threshold field of the film, only domain wall switching at relatively low driving fields could be accomplished.

As an instance of using a roughened substrate it is observed that the 60-cycle hysteresis wall motion coercive force, and the corresponding wall motion switching threshold of the resultant film is higher than that of a similarly prepared film using a less rough or relatively smooth substrate. The rotational switching threshold, however, remains about the same. In the films of the present invention the threshold field required for switching by wall motion exceeds a value of one-half of that field required to switch by rotation. Thereby in coincident-current memory selection systems utilizing these films an increased full select field may be used to switch the film, accomplishing it thereupon by rotation rather than wall motion. Comparative switching characteristics of thin magnetic films having differently prepared substrates is presented in the table below.

| Condition of Substrate | Observed Threshold Field Required to Induce Wall Motion Switching (oersteds) | Corresponding Switching Constant (oer.-microsec.) | Observed Threshold Field Required to Induce Rotational Switching (oersteds) | Corresponding Switching Constant (oer.-microsec.) | Switching[a] Time, $T_s$ |
|---|---|---|---|---|---|
| | | | | | (musec.) |
| Relatively Smooth | 0.9 | 0.80 | 2.1 | 0.60 | [b] 800 |
| Roughened (Abrasive Paper 320). | 1.5 | 0.60 | 2.4 | 0.24 | [c] 400 |

[a] The switching field was applied in the plane of the film along the easy direction.
[b] The full select field was 2.0 oersteds (coincident-current operation).
[c] Full select field 2.4 oersteds.

The process of the present invention of scribing lines on the substrate member prior to metal deposition therefore provides a thin magnetic film element having both good magnetic orientation and improved switching characteristics.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A method of providing a magnetic element with easy axis of magnetic remanent flux orientation which comprises ascribing a series of grooves on the surface of a non-magnetizable substrate member in the configuration of the magnetic orientation desired and depositing a metallic magnetic material in the form of a continuous film onto the surface of said substrate member, whereby the easy axis of magnetic orientation is formed by and directed along the grooves of said substrate member.

2. The method of producing magnetic elements having square hysteresis loops and exhibiting an easy axis of remanent flux orientation which comprises the steps of ascribing a series of grooves on the surface of a non-magnetizable substrate member in a configuration of orientation desired for the easy axis of said member, effectively vaporizing metallic magnetic material in the vicinity of said substrate member, and depositing said vaporized magnetic material upon said substrate member in the form of a continuous film, whereby the easy axis of said element is formed by and directed along th grooves of said substrate member.

3. A magnetic storage element exhibiting an easy axis of magnetization defining opposite stable states of remanent flux orientation comprising a non-magnetizable substrate member formed with a plurality of surficial grooves having a predetermined depth and spacing relative to one another overlaid with a continuous metallic magnetic film having a thickness dependent upon the predetermined depth and distance of said grooves whereby the easy axis of said element is enabled by and directed along the grooves of said substrate member.

4. A magnetic storage element exhibiting an easy axis of magnetization defining opposite stable states of remanent flux orientation comprising a non-magnetizable substrate member formed with a plurality of surficial grooves having a peak-to-valley height of approximately 8 microns, a peak-to-peak distance of approximately 48 microns overlaid with a continuous metallic magnetic film having a thickness of from 2,000 to 10,000 Angstroms dependent upon the depth and spacing of said grooves whereby the easy axis of said element is enabled by and directed along the grooves of said substrate member.

References Cited in the file of this patent

UNITED STATES PATENTS

| | | |
|---|---|---|
| 1,820,240 | Michell | Aug. 25, 1931 |
| 2,185,300 | Hickman | Jan. 2, 1940 |
| 2,501,126 | Howell | Mar. 21, 1950 |
| 2,511,121 | Murphy | June 13, 1950 |
| 2,581,765 | Mann et al. | Jan. 8, 1952 |
| 2,819,186 | Franck | Jan. 7, 1958 |
| 2,844,665 | Mann et al. | July 22, 1958 |

FOREIGN PATENTS

| | | |
|---|---|---|
| 284,786 | Great Britain | Feb. 6, 1928 |
| 650,675 | Great Britain | Feb. 28, 1951 |
| 670,993 | Great Britain | Apr. 30, 1952 |